(12) United States Patent
Mortari

(10) Patent No.: US 6,595,552 B1
(45) Date of Patent: Jul. 22, 2003

(54) DEVICE FOR COUPLING MULTIPLE CONNECTORS

(75) Inventor: Graziano Mortari, Brescia (IT)

(73) Assignee: Idra Presse S.p.A., Brescia (IT)

( * ) Notice: Subject to any disclaimer, the term of this patent is extended or adjusted under 35 U.S.C. 154(b) by 0 days.

(21) Appl. No.: 09/693,810

(22) Filed: Oct. 23, 2000

(30) Foreign Application Priority Data

Nov. 30, 1999 (IT) .......................................... PD00A0267

(51) Int. Cl.[7] ................................................ F16L 55/00
(52) U.S. Cl. ............................................ 285/24; 285/18
(58) Field of Search ............................... 285/25, 20, 18, 285/19, 24, 27, 28, 124.1, 124.3, 920

(56) References Cited

U.S. PATENT DOCUMENTS

| | | | | |
|---|---|---|---|---|
| 3,774,636 A | * | 11/1973 | Arita | 285/24 X |
| 4,153,278 A | * | 5/1979 | Ahlstone | 285/18 |
| 4,157,196 A | * | 6/1979 | de Meulemeester | 285/18 |
| 4,191,256 A | * | 3/1980 | Croy et al. | 285/920 X |
| 4,441,740 A | * | 4/1984 | Cowan et al. | 285/18 |
| 4,485,653 A | * | 12/1984 | Rasmussen | 285/18 X |
| 4,770,250 A | * | 9/1988 | Bridges et al. | 285/18 X |
| 5,024,467 A | * | 6/1991 | Truchet | 285/24 X |
| 5,834,721 A | * | 11/1998 | Ostergaard et al. | 200/81 R |
| 6,017,065 A | * | 1/2000 | Hellesoe | 285/24 X |

FOREIGN PATENT DOCUMENTS

| | | |
|---|---|---|
| EP | 0 095 625 | 12/1983 |
| EP | 0 205 093 | 12/1986 |

OTHER PUBLICATIONS

Patent Abstracts of Japan, vol. 012, No. 182 (M–702), May 27, 1988, & JP 62 292246 A ( Nippon Steel Corp; Others: 01), Dec. 18, 1987 *abstract*.

* cited by examiner

Primary Examiner—Eric K. Nicholson
Assistant Examiner—David E. Bochna
(74) Attorney, Agent, or Firm—Guido Modiano; Albert Josif; Daniel O'Byrne

(57) ABSTRACT

A device for coupling multiple connectors, comprising two connector supporting plates, one fixed and one movable, and two threaded members which are supported by the two plates; one of the members has a combined rotary and translatory motion for the coupling and uncoupling of the plates; the member provided with combined rotary and translatory motion is associated with a fluid-actuated actuator for the approach and spacing of the threaded members.

9 Claims, 4 Drawing Sheets a
DEVICE FOR COUPLING MULTIPLE CONNECTORS

BACKGROUND OF THE INVENTION

The present invention relates to a device for coupling multiple connectors, of the type that comprises two connector supporting plates, particularly for pressure die-casting dies.

Devices for coupling the supporting plates of multiple connectors are already commercially available.

The plates, one fixed and one movable, are connected to threaded members, and the threaded member that is connected to the movable plate is formed by a rod which is provided with a threaded section and is supported for rotation by a movable ring integrated in the corresponding plate.

The movable ring is supported by a fixed frame by means of sliding guides that ensure the assembly thereof with a framework which forms the support for a motor which is designed to turn the rod.

The rotation rod is connected to the output shaft of the motor by means is of an intermediate shaft provided with a threaded section which cooperates with an internal thread of the frame in order to provide the longitudinal movement of the rod before the threaded section thereof cooperates with the other threaded member.

The rotation rod is connected in an angular manner to the intermediate shaft by means of a sliding joint which allows the rod to interrupt its advancement while it continues to be rotationally actuated.

Elastic elements cooperate with the guides, allowing to block the advancement of the movable ring, but not the rotation of the rod if the two threaded members do not couple as soon as they make contact.

In any case, this kind of device is not free from drawbacks.

The coupling between the threaded members in fact occurs in a rough manner, except in unusual cases, since the shoulders of the threads make contact first and collide with each other; at this point the geometry of the device allows to stop the translatory motion of the plates until the two threads mate.

Accordingly, the movements of the plates are not gradual and the geometry is particularly complicated.

SUMMARY OF THE INVENTION

The aim of the present invention is to provide a device for coupling multiple connectors which solves the problems of conventional devices.

Within the scope of this aim, a consequent object of the present invention is to provide a device which allows the coupling of connectors gradually and not discontinuously.

Another object of the present invention is to provide a device which does not have a complicated geometry.

Another object of the present invention is to provide a device which allows to perform the approach and centering movement with limited force.

This aim and these and other objects which will become better apparent hereinafter are achieved by a device for coupling multiple connectors, comprising two connector supporting plates, one fixed and one movable, two threaded members which are supported by the two plates, one of said members having a combined rotary and translatory motion for the coupling and uncoupling of said plates, characterized in that the member provided with combined rotary and translatory motion is associated with a fluidactuated actuator for the approach and spacing of said threaded members.

BRIEF DESCRIPTION OF THE DRAWINGS

Further characteristics and advantages of the present invention will become better apparent from the following detailed description of a preferred but not exclusive embodiment thereof, illustrated only by way of non-limitative example in the accompanying drawings, wherein.

DESCRIPTION OF THE PREFERRED EMBODIMENTS

Figure 1:
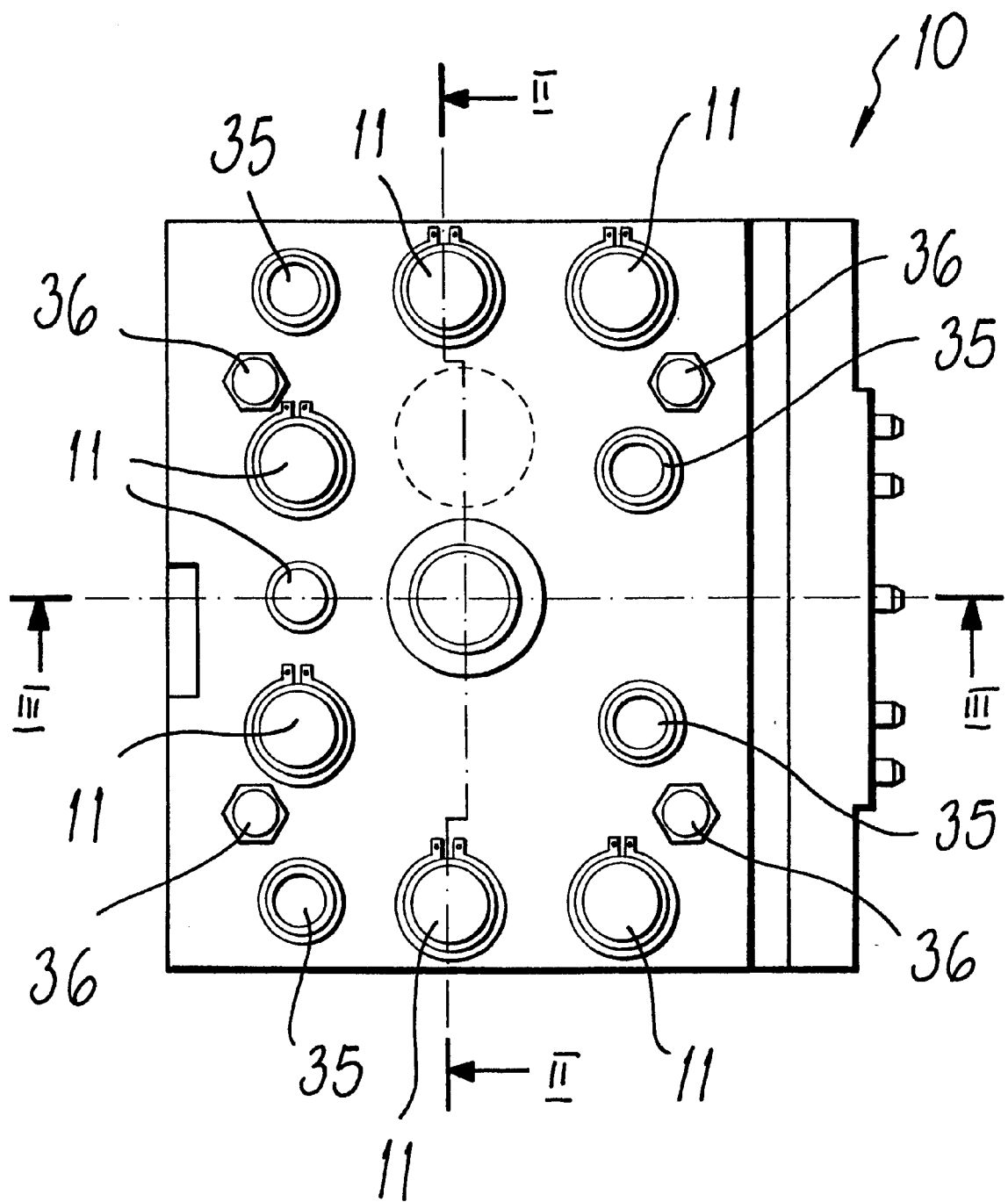
FIG. 1 is a front view of a device according to the invention.
Figure 2:
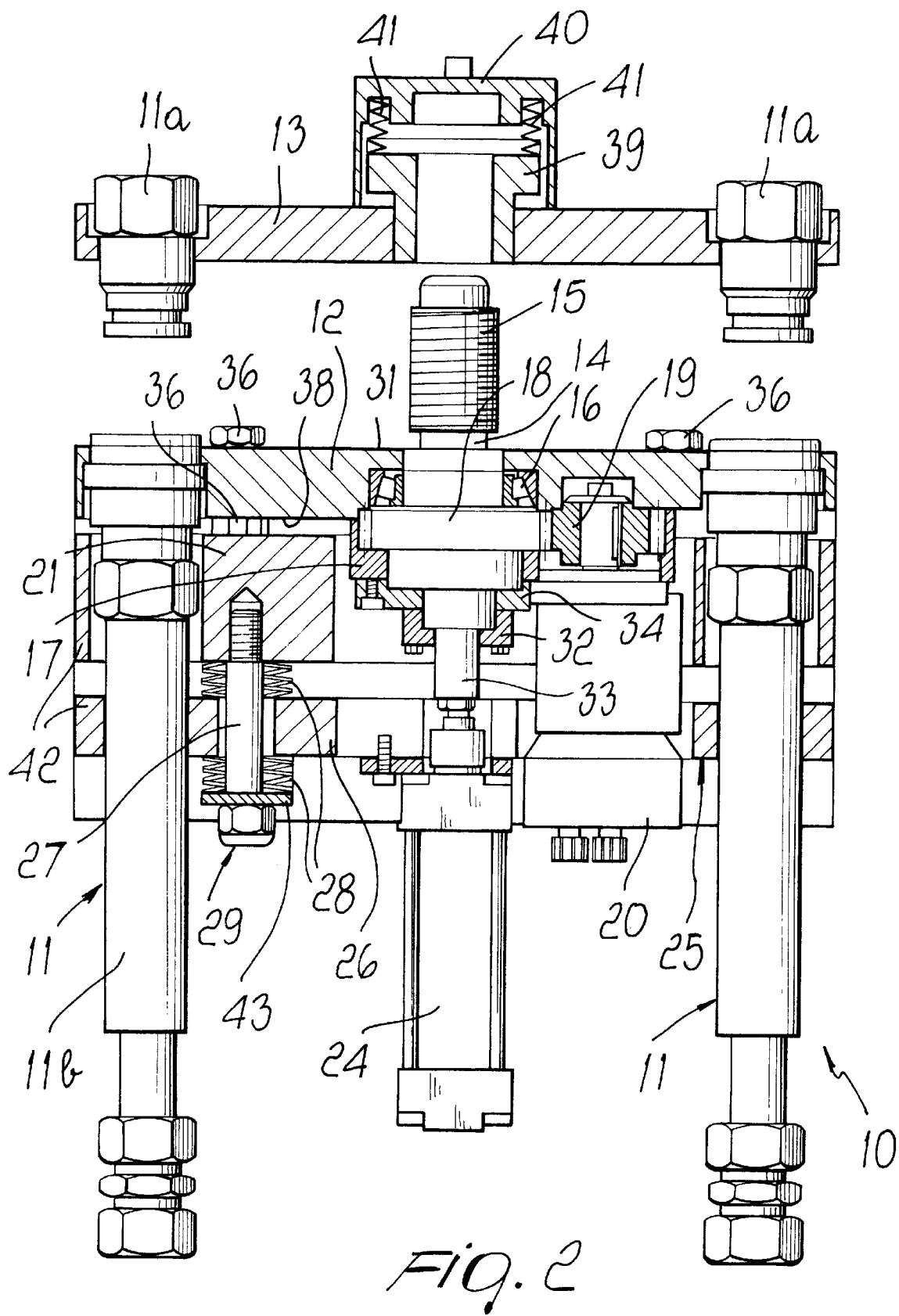
FIG. 2 is a sectional view of the device of FIG. 1, taken along the line II—II.
Figure 3:
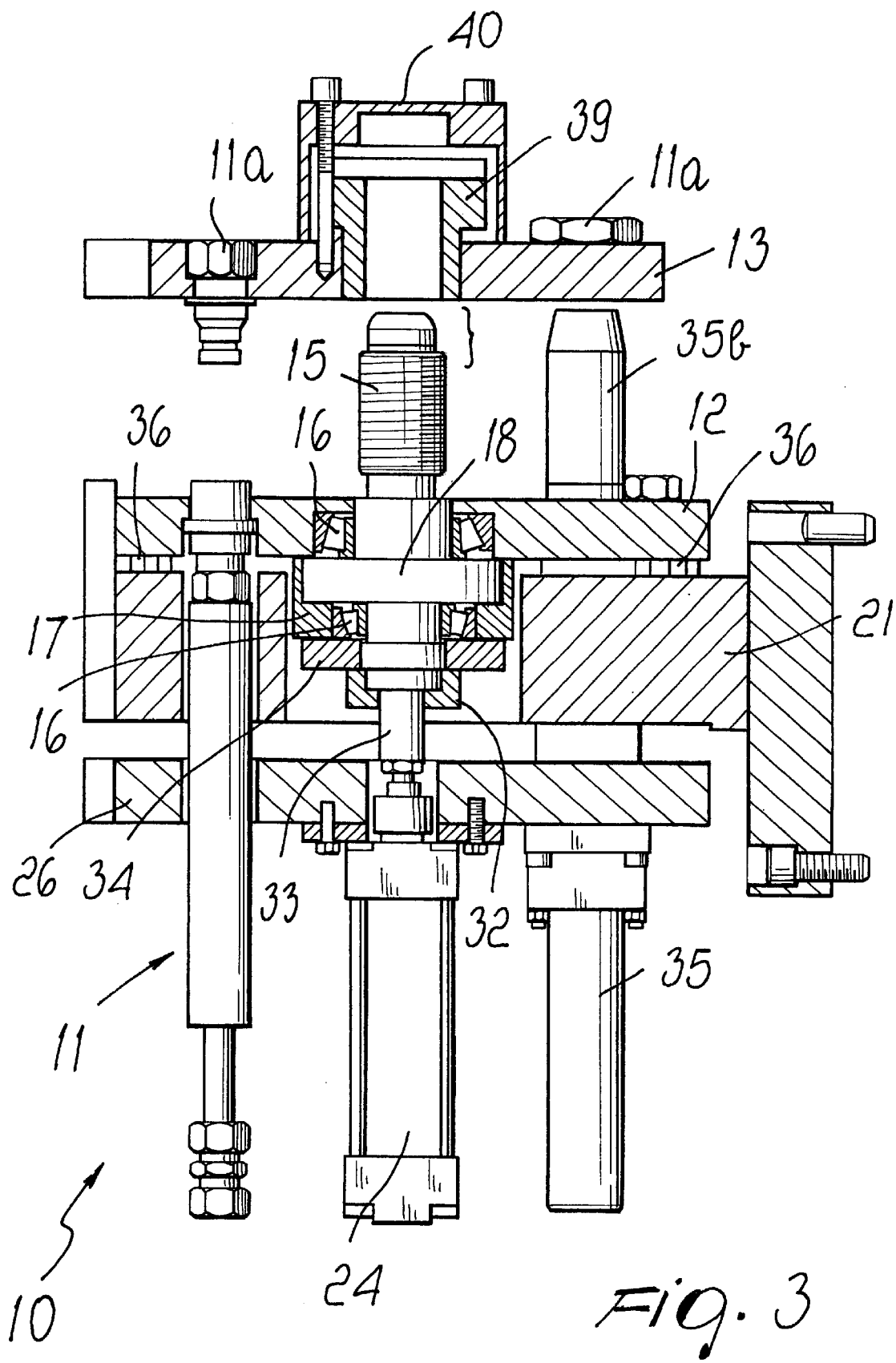
FIG. 3 is another sectional view of the device of FIG. 1, taken along the line III—III.
Figure 4:
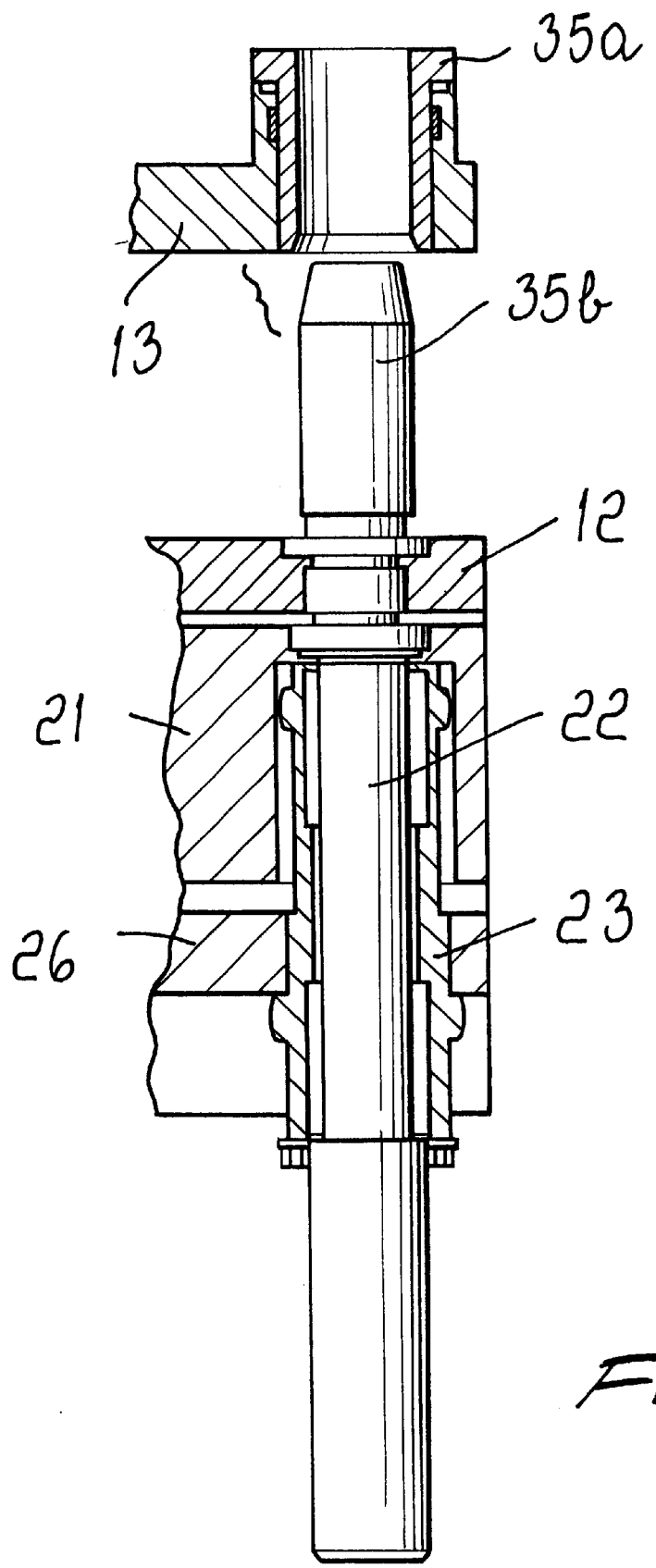
FIG. 4 is a view of a detail of the device.

With particular reference to FIGS. 1 to 3, a device having a structure according to the invention is generally designated by the reference numeral 10.

The device 10 comprises two supporting plates for connectors 11: one is fixed and designated by the reference numeral 12, and the other one is movable and designated by the reference numeral 13.

The fixed plate 12 supports a threaded member which is constituted by a shaft 14 with a threaded head 15.

The shaft 14 rests on roller bearings 16, of which one is rigidly coupled to the fixed plate 12 and another one is fitted on a box-like body 17 which is also rigidly coupled to the fixed plate 12 and arranged at the rear end of the shaft 14.

Between the bearings 16, the shaft 14 supports a first gear 18 keyed to the shaft and meshes with a second gear 19 keyed onto the shaft of a hydraulic motor 20 which is rigidly coupled to the fixed plate 12.

Sleeves 23, rigidly coupled to a fixed frame 21, constitute seats for the sliding of corresponding rods 22 which support the fixed plate 12 at one end of the fixed frame 23 and form, at the other end, a framework 25 for supporting a fluid-actuated actuator 24.

The framework 25 is constituted by a plate 26 which is indeed supported by the sleeves 23 and is connected to the frame by means of elastic elements 29 which are constituted by a screw 27 which passes through the plate 26 and screws onto the frame 21.

The screw 27 compresses two helical springs 28 between the frame 21 and the plate 26 and between the plate 26 and a washer 43.

The box-like body 17 which contains the means for connecting the shaft 14 to the motor 20 is provided with a cover 31 to which a locking cap 32 is fixed for a substantially cylindrical element 33 having an enlarged head and whose rear end is connected by means of a screw 34 to the head of the stem of the actuator 24.

The plates 12 and 13 that support the connectors 11 are further provided with centering elements 35.

The centering elements 35 are constituted by female elements 35a, which are supported by the movable plate 13, and by male elements 35b, which are supported by the fixed plate 12; said male elements 35b are the head of said rods 22 which can slide within the sleeves 23.

Also the connectors 11 are constituted by female elements 11a which are supported by the movable plate 13 and by male elements 11b which are supported by the fixed plate 12 and have such a longitudinal extension that it is necessary to form through holes 42 in the frame 21 and the plate 26 of the framework 25.

The fixed plate 12 is further provided with stroke limiters 36 which are arranged on the surface 37 that faces the movable plate 13 and on the opposite surface 38.

Finally, the movable plate 13 is provided with a threaded member for coupling to the head 15 of the shaft 14, which is constituted by an internally threaded bush 39 which is contained, with a slight play for orientation, within a cover-shaped support 40 rigidly coupled to the movable plate 13.

The bush 39 is associated with elastic elements 41.

During operation, from the position in which the connectors 11 are fully open, i.e., the position in which the movable plate 13 is adjacent to the frame 21, the actuator 24 is actuated and moves the plate 13 toward the plate 12.

When the two plates 12 and 13 are close, the centering elements 35 allow optimum alignment of the two threaded members also by way of the slight possibility of orientation of the plate 13 by means of the elastic elements 29 and of the bush 39.

When the two threaded elements 15 and 39 are close one another, the actuator 24 is deactivated and the motor 20 is activated, turning the shaft 14, which screws onto the bush 39, and allowing the connection of the connectors 11.

Since the connection of the connectors 11 is nonreversible, it also allows to use unions which are not self-retaining.

The stroke limiters 36 allow to detect the position of the movable plate 13 and therefore to know when to actuate and/or disconnect the motor 20 and the actuator 24.

In practice it has been observed that the intended aim and objects of the present invention have been achieved.

The device in fact allows coupling of the connectors without sudden movements or collisions of elements, in a continuous and gradual manner.

Moreover, the geometry is not particularly complicated.

In practice, the materials used, as well as the dimensions, may be any according to requirements.

The invention thus conceived is susceptible of numerous modifications and variations, all of which are within the scope of the inventive concept.

All the details may furthermore be replaced with other technically equivalent elements.

The disclosures in Italian Patent Application No. PD99A000267 from which this application claims priority are incorporated herein by reference.

What is claimed is:

1. A device for coupling multiple connectors, comprising two connector supporting plates, one fixed and one movable, two threaded members which are supported by the two plates, one of said members having a combined rotary and translatory motion for the coupling and uncoupling of said plates, the member provided with combined rotary and translatory motion being associated with a fluid-actuated actuator for the translatory approach and spacing of said threaded members, and the member provided with combined rotary and translatory motion being further associated with a fluid-actuated motor separate and independent of said fluid-actuated actuator for providing translatory motion to the member provided with combined rotary and translatory motion.

2. The device according to claim 1, wherein said threaded member supported by the fixed plate is constituted by a threaded bush which is contained internally with a slight play for orientation within a support and is associated with elastic elements.

3. The device according to claim 1, wherein said threaded member having a combined rotary and translatory motion is supported so that it is axially rigidly coupled but can rotate freely, by said movable plate, and wherein sleeves which are rigidly coupled to a fixed frame constitute sliding seats for corresponding rods which support said movable plate at one end of the fixed frame and form, at the other end, a framework for supporting a fluid-actuated actuator.

4. The device according to claim 3, wherein said framework comprises a plate which is connected to the frame also by means of elastic elements for settling said framework.

5. The device according to claim 3, wherein said member provided with combined rotary and translatory motion is formed by a shaft having a threaded head and provided with means for connection to said fluid-actuated motor which is rigidly coupled to the movable plate, said movable plate supporting means for connection to a stem of said fluid-actuated actuator.

6. The device according to claim 3, wherein said plates support centering devices constituted by female elements which are rigidly coupled to the fixed plate and male elements which are rigidly coupled to the movable plate, said male elements being the head of said rods which can slide within sleeves being rigidly coupled to the frame.

7. The device according to claim 1, wherein said movable plate is provided with stroke limiters for both directions of motion.

8. A device for coupling multiple connectors, comprising two connector supporting plates, one fixed and one movable, two threaded members which are supported by the two plates, one of said members having a combined rotary and translatory motion for the coupling and uncoupling of said plates, the member provided with combined rotary and translatory motion being associated with a fluid-actuated actuator for the approach and spacing of said threaded members, said threaded member having a combined rotary and translatory motion being supported so that it is axially rigidly coupled but can rotate freely, by said movable plate, and wherein sleeves which are rigidly coupled to a fixed frame constitute sliding seats for corresponding rods which support said movable plate at one end of the fixed frame and form, at the other end, a framework for supporting a fluid-actuated actuator, said member provided with combined rotary and translatory motion being formed by a shaft having a threaded head and provided with means for connection to a fluid-actuated motor which is rigidly coupled to the movable plate, said movable plate supporting means for connection to a stem of said fluid-actuated actuator, and said means for connection to said fluidactuated motor being constituted by a gear, which is keyed onto said shaft with a threaded head and meshes with another gear which is keyed onto the shaft of said fluidactuated motor, and are contained in a box-like body.

9. The device according to claim 6, wherein said means for connection to a stem of said actuator are constituted by a cover which is rigidly coupled to said box-like body at a rear end of the shaft having a threaded head, a locking cap being fixed onto said cover for a substantially cylindrical element which has an enlarged head, a rear end of said cylindrical element being connected, by means of a screw, to a head of the stem of said actuator.

* * * * *

UNITED STATES PATENT AND TRADEMARK OFFICE
CERTIFICATE OF CORRECTION

PATENT NO. : 6,595,552 B1
DATED : July 22, 2003
INVENTOR(S) : Graziano Mortari

It is certified that error appears in the above-identified patent and that said Letters Patent is hereby corrected as shown below:

<u>Title page,</u>
Item [30], Foreign Application Priority Data, should read:
-- Nov. 30, 1999 (IT) ……………………… PD99A000267 --

Signed and Sealed this

Twentieth Day of January, 2004

JON W. DUDAS
*Acting Director of the United States Patent and Trademark Office*